June 11, 1940.                    P. L. BOWSER, JR                    2,204,173
                                   MELTING FURNACE
                                 Filed Aug. 30, 1937                3 Sheets-Sheet 1
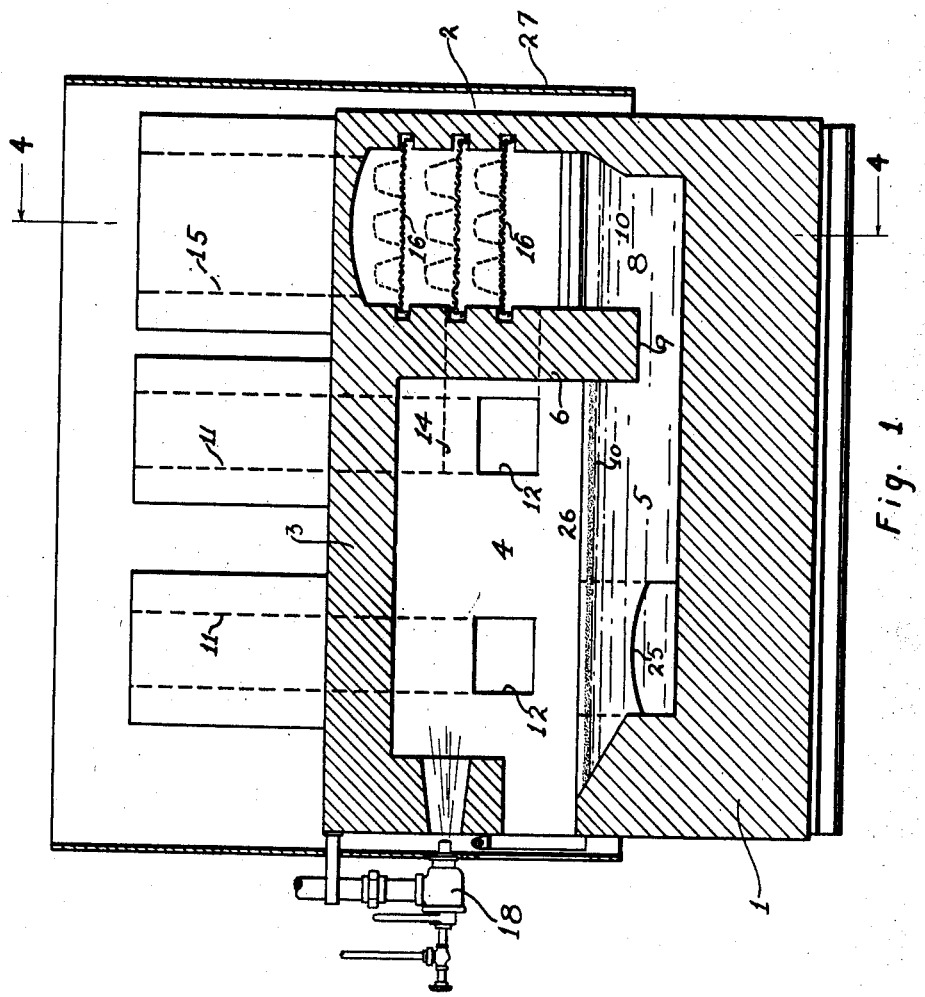
INVENTOR.
Percy L. Bowser, Jr.
BY
ATTORNEYS.

June 11, 1940.                P. L. BOWSER, JR                 2,204,173
                                MELTING FURNACE
                              Filed Aug. 30, 1937        3 Sheets-Sheet 2
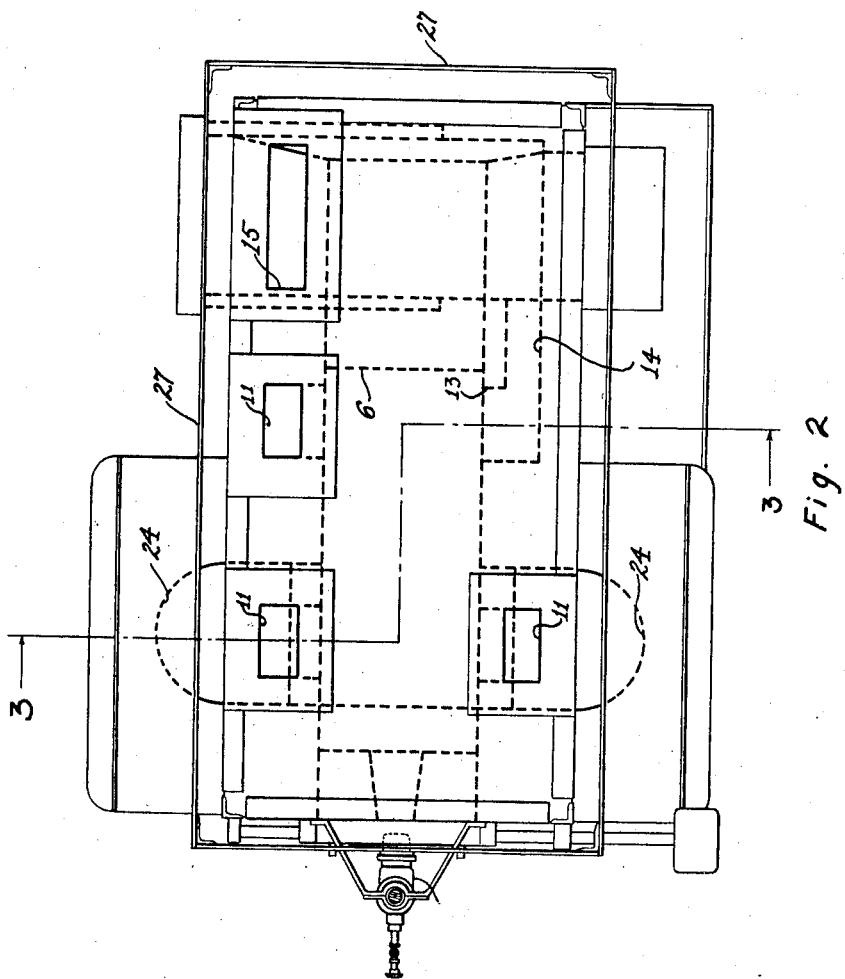
INVENTOR.
Percy L. Bowser, Jr.
BY
                    ATTORNEYS.

June 11, 1940.　　　P. L. BOWSER, JR　　　2,204,173
MELTING FURNACE
Filed Aug. 30, 1937　　　3 Sheets-Sheet 3
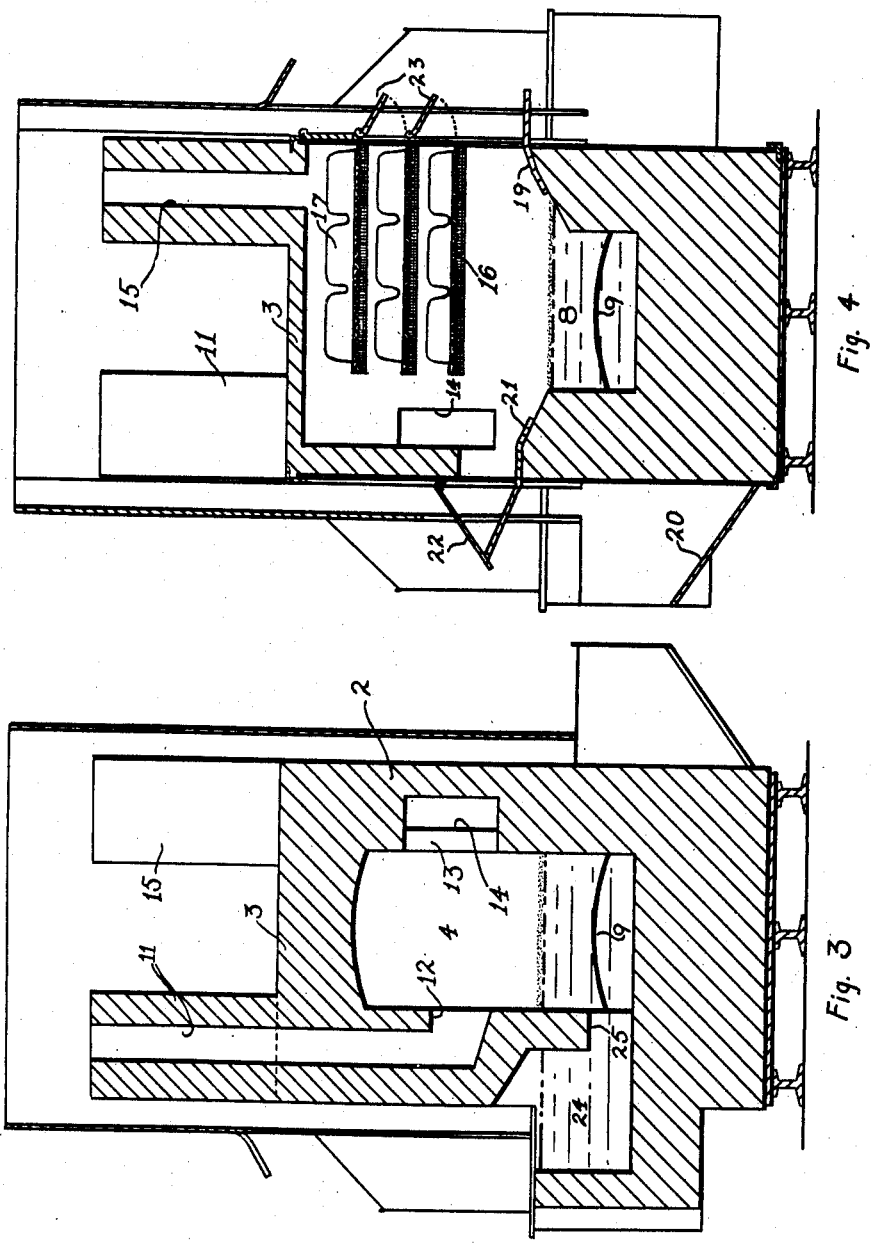
INVENTOR.
Percy L. Bowser, Jr.
BY
Bruninga & Sutherland
ATTORNEYS Patented June 11, 1940

2,204,173

UNITED STATES PATENT OFFICE 2,204,173

MELTING FURNACE

Percy L. Bowser, Jr., St. Louis, Mo., assignor to The Sterling Corporation, St. Louis, Mo., a corporation of Delaware Application August 30, 1937, Serial No. 161,581

3 Claims. (Cl. 266—33)

This invention pertains to the art of casting light metals such as aluminum and more particularly to a means for melting the metal and storing the molten metal in such manner as to be available as a supply for pouring castings.

It has been found that aluminum and its alloys, when cast into ingots, is often more or less porous. When such porous ingots are stored for any length of time they are very prone to absorb moisture or gaseous impurities from the atmosphere. When such ingots are melted in the ordinary manner by simply fusing them in a melting pot, such impurities remain in the molten metal usually with deteriorating effects.

One of the objects of this invention, therefore, is to provide an apparatus whereby ingots of such metals may be purged of their impurities before melting.

It has also been found that when molten metals of this type are stored in a storage or collecting pot, which is heated by a flame such as that of an oil burner, the metal often takes up impurities from the products of combustion which form the atmosphere of the storage chamber.

Another object is to provide a melting furnace of novel construction and arrangement wherein metal ingots may be pretreated to drive out absorbed impurities before melting.

Another object is to provide such a furnace having separate melting and collecting pots for the metal such as to facilitate melting, storage and also to provide convenient access for dipping out the metal in order to pour castings.

Another object is to provide such a melting furnace with improved arrangements for heating the same and for controlling the heating thereof.

Further objects will appear from the following description taken in connection with the accompanying drawings in which Figure 1 is a vertical longitudinal section of a melting furnace embodying this invention.

Figure 2 is a plan of the same.

Figure 3 is a section on line 3—3 of Figure 2 and

Figure 4 is a section on line 4—4 of Figure 1.

Referring now to the drawings, 1 designates the base or foundation of the furnace which may be constructed of any suitable type of refractory material. Built upon the base 1 are walls 2 surmounted by a roof 3. These may all be of refractory material of any suitable type. The structure is such as to provide in the forward part of the furnace a storage or collecting chamber 4 providing in the bottom thereof a collecting pot or receptacle 5. Separated from the chamber 4 by a vertical partition 6 is a roasting chamber 7, provided in the bottom thereof with a melting pot or receptacle 8. The wall 6 does not extend clear to the bottom of the pot but terminates at its lower extremity in a low arch 9 spaced from the bottom of the melting and collecting pots so as to provide communication between them below the normal level of the molten liquid contained in them during operation. This level is indicated at 10 in Figure 1.

Arranged at intervals along the collecting chamber 4 are vertically extending outlet flues 11. These flues communicate with the interior of said chamber by flue openings 12 in the side walls of the chamber. The number and spacing of these flues may be so arranged as to provide for the exit of certain proportions of the products of combustion at these spaced points along the chamber 4. By regulating the size and spacing of these flues the distribution of heat in the chamber 4 may be controlled.

Extending from a flue opening 13 in a side wall of the chamber 4 is a horizontally extending flue 14. This flue extends rearwardly in the side wall of the furnace so as to penetrate the partition 6 and enter the melting chamber 7, thereby establishing communication between the chambers 4 and 7 and providing a duct whereby products of combustion may be conducted from the chamber 4 to the chamber 7 in order to heat the latter chamber. The chamber 7 is provided with an outlet flue 15 extending upwardly from the roof thereof so as to provide exit for such products of combustion. The flue 14 may be made of ample size so as to conduct into the chamber 7 enough of the products of combustion to heat said chamber to the proper temperature. Arranged in the chamber 7 are one or more shelves 16 upon which the ingots 17 may be placed for roasting the same, as will be more particularly described presently. The shelves 16 may be constructed of wire mesh or other perforated material so as to provide for circulation of the heating gases therethrough so that said gases may have access to all parts of the chamber 7 and to all of the ingots on the shelves 16.

In the operation of this furnace the same may be heated by a suitable flame projected into the chamber 4 by any suitable burner 18. This flame heats the chamber 4 to a proper temperature for storing the molten metal and the products of combustion escape by way of the flues 11 and 14. The gases passing through the flue 14 pass into the chamber 7 so as to heat said chamber to a proper temperature. The ingots 17 which are to be melted to supply the pool of molten metal are first placed upon the shelves 16 to be preheated and subjected to a roasting temperature for a sufficient time to drive off volatile impurities which may be contained in their pores. When an ingot has been properly roasted, it is removed from the shelf 16 and placed upon a sill or chute 19 so as to slide into the melting pot 8 to be melted down and added to the pool of molten metal. The level of the molten metal is maintained about as indicated in the drawings by the line 18. As new metal is melted in the melting pot 8 and metal is withdrawn from the collecting pot 5 for pouring castings, the new metal passes from the pot 8 under the arch 9 and into the pot 5. In this manner a supply of new metal may be maintained and at the same time the new ingots may be roasted so as to free them of impurities before adding them to the pool. In order to provide for remelting scrap metal such as sprues, the structure may be provided with a scrap bin 20 and a scrap feed chute 21 for passing this material into the melting pot. The feed opening at the chute 21 may be closed by a suitable door or cover 22. Similarly, the openings opposite the shelves 16 may be closed by swinging doors 23.

Adjacent the collecting pot 5 on one or both sides of the furnace there may be provided dipping wells 24. Each well may be arranged to communicate with the pot 5 by a low arch 25 similar to the arch 9 and below the level of the molten metal so that the metal from the pot 5 will continually flow into the dipping well as metal is withdrawn from the latter. The dipping wells 24 provide means whereby the metal may be conveniently withdrawn for pouring castings without disturbing the metal in the main pool in the pot 5. This is advantageous because it exposes only a small surface of the metal to the atmosphere and this for a comparatively short time, because the exposed metal is continually being withdrawn so long as casting operations are in progress.

It has been found that, when molten metal is held in the pool 5 exposed to the products of combustion in the chamber 4, the metal sometimes absorbs impurities from the gases and such impurities may affect the resulting castings. It is also found that incrustations of aluminum oxide form along the walls of the pool 5 along the line of the liquid level 18. Such incrustations are very hard and are practically impossible to dislodge without damaging the furnace walls. It has been found advantageous, therefore, to cover the molten metal in the pot 5 with a protective blanket of a material which is non-reactive chemically with the metal in the pool and which will at the same time provide a shield against contact of the gases in the chamber 4 with the molten metal. A material particularly suitable for this purpose is wood ash. It has been found that by covering the metal in this pool with a layer 26 of charcoal about ½ inch thick, the charcoal soon burns to ash and leaves a layer of such ash upon the surface of the pool. This ash has no tendency to react chemically with the metal in the pool and has no action as a flux, but is simply a protective layer to prevent contact with the molten metal. It has also been found that when such a blanket of ash is maintained on the surface of the pool, the tendency to form an incrustation of oxide along the walls of the pool is practically entirely overcome. It will be noted that by the arrangement whereby the chamber 4 is completely enclosed and separated both from the chamber 7 and from the dipping wells 24 the metal in the pot 5 is not disturbed by any of the normal operations of the furnace, namely, either by dipping metal from the wells 24 or by placing ingots to be melted in the pot 8. Accordingly, the blanket 26 may be maintained undisturbed for a considerable period of time.

It will be seen, therefore, that this invention provides a melting furnace whereby a continuous movement of metal from the melting pot to the dipping wells may be maintained so as to keep a supply available in the dipping wells for casting operations. The purity of the metal is safeguarded throughout its passage through the furnace. The new ingots are first roasted so as to drive off volatile impurities and thereby the introduction of such impurities into the molten metal upon melting of the ingot is avoided. The molten metal resulting from fusion of the new ingots passes into the collecting pot 5 at a point below the liquid level so that there is a gradual flow from the pot 8 to the pot 5 in such a manner as not to disturb the metal in the latter pot to any appreciable extent. A large pool may be maintained in the pot 5 without deterioration as the blanket 26 protects the metal from contamination by the combustion gases. The metal then flows out under the arches 25 to be available in the dipping wells 24 for pouring castings. The arrangement of the flues is such as to carry off the combustion gases and to convey a suitable portion thereof to the chamber 7 so that the latter may be properly heated for melting the metal and at the same time for roasting the new ingots. In order to protect the workmen in the vicinity of the furnace from excessive heat therefrom, a shield or jacket 27 may be arranged to surround the furnace with air space therebetween through which air may circulate so as to keep the shield at a low temperature. This avoids injuries to workmen by accidental contact with hot surfaces and also prevents excessive radiation of heat into the foundry room. The air circulating in this air space comes in direct contact with the refractory material of the furnace walls at the level of the molten metal therein so as to cool the walls, and it is believed that this assists materially in preventing the formation of the oxide incrustation mentioned above.

While the apparatus involved in this invention has been described as a unitary combination, it will be understood that individual features of the apparatus may be useful by themselves and without reference to other features or the complete combination. Accordingly, it is understood that this invention contemplates the employment of such individual features or sub-combinations as within the scope of the appended claims.

It is further obvious that various changes in the details of construction may be made within the scope of the appended claims without departing from the spirit of this invention, and it is understood accordingly, that the invention is not limited to the specific details shown or described.

Having thus described the invention, what is claimed is:

1. A melting furnace for light metals such as aluminum having side and end walls, a crosswall dividing the furnace into separate roasting and collecting chambers, means providing a melting receptacle in said roasting chamber and a collecting receptacle for the molten metal in said collecting chamber, means providing a passage through said cross-wall establishing communication between said receptacles below the level of the molten metal therein and through which molten metal may flow from one to the other, means for projecting a flame into said collecting chamber over said collecting receptacle, one or more outlet flues from said collecting chamber extending upwardly in said side walls, a heat-transferring flue in one of said walls extending horizontally around said cross-wall to carry combustion gases from said collection chamber to said roasting chamber to heat the latter, a roasting support for ingots in said roasting chamber, a dipping pool on the outside of said collecting chamber communicating with said collecting receptacle, and an envelop providing a circulation space along said outside walls adapted to promote circulation of atmospheric air in contact with the wall surface to cool the same.

2. A melting furnace of the character described having a wall of refractory material enclosing a melting chamber and a collecting chamber, means for heating said chambers, and a jacket arranged outside of said wall so as to envelop the furnace and spaced from said wall to provide therebetween an air-circulation space, said space being open at its top and bottom so as to promote circulation of atmospheric air therethrough and in contact with the refractory material of said wall, and said jacket extending downwardly to the level of the molten metal in said chambers so as to cool the wall at that level.

3. A melting furnace for light metals such as aluminum, having side and end walls, a cross-wall extending from one to the other of said side walls to form on one side thereof a roasting chamber, a support in said chamber for a metal ingot, means providing a melting receptacle in said chamber, a collecting chamber for the molten metal on the other side of said cross-wall having means providing a collecting receptacle therein communicating with said melting receptacle below the normal level of the molten metal by a passage below said cross-wall, means for projecting a flame into said collecting chamber an outlet flue in one of said side walls to discharge the products of combustion from said collecting chamber, a flue in one of said side walls extending horizontally around said cross-wall and connecting said chambers to carry the products of combustion to said roasting chamber, said flue entering said roasting chamber at a point lower than said ingot support, and a discharge flue from said roasting chamber.

PERCY L. BOWSER, Jr.